United States Patent
Reed et al.

(10) Patent No.: US 9,653,970 B2
(45) Date of Patent: May 16, 2017

(54) ROTARY CAPACITOR FOR SHUNTING HIGH FREQUENCY BEARING CURRENTS AND REDUCING EMI IN ELECTRIC MACHINERY

(71) Applicant: C-Motive Technologies Inc., Madison, WI (US)

(72) Inventors: Justin Kyle Reed, Madison, WI (US); Daniel Colin Ludois, Madison, WI (US); William P. Mason, Brooklyn, WI (US); Donald Wolf, Madison, WI (US)

(73) Assignee: C-Motive Technologies Inc., Madison, WI (US)

( * ) Notice: Subject to any disclaimer, the term of this patent is extended or adjusted under 35 U.S.C. 154(b) by 0 days.

(21) Appl. No.: 15/108,059

(22) PCT Filed: Feb. 4, 2015

(86) PCT No.: PCT/US2015/014436
§ 371 (c)(1),
(2) Date: Jun. 24, 2016

(87) PCT Pub. No.: WO2015/120033
PCT Pub. Date: Aug. 13, 2015

(65) Prior Publication Data
US 2016/0329780 A1 Nov. 10, 2016

Related U.S. Application Data

(60) Provisional application No. 61/936,190, filed on Feb. 5, 2014, provisional application No. 62/044,443, filed (Continued)

(51) Int. Cl.
*H02K 11/00* (2016.01)
*H02K 11/028* (2016.01)
*H02K 11/40* (2016.01)

(52) U.S. Cl.
CPC ....... *H02K 11/028* (2013.01); *H02K 11/0094* (2013.01); *H02K 11/40* (2016.01)

(58) Field of Classification Search
CPC .. H02K 11/0094; H02K 11/028; H02K 11/40; H02K 11/046; H02K 11/0089
(Continued)

(56) References Cited

U.S. PATENT DOCUMENTS 2,439,255 A 4/1948 Longfellow
3,034,838 A 5/1962 Abel
(Continued)

FOREIGN PATENT DOCUMENTS

EP 1143602 A2 10/2001
EP 2569851 A1 3/2013
(Continued)

OTHER PUBLICATIONS

Muetze, A, et al., "Don't lose your bearings," IEEE *Ind. Appl. Mag.*, vol. 12, No. 4, pp. 22-31, 2006.

*Primary Examiner* — Hanh Nguyen
(74) *Attorney, Agent, or Firm* — Craig A. Fieschko, Esq.; DeWitt Ross & Stevens S.C.

(57) ABSTRACT

Rotary capacitor assemblies divert or mitigate high-frequency electrical currents and voltages in bearings of electric machinery (e.g., motors and generators) without direct contact with the bearings. The assemblies include rotating capacitors, in which surfaces in close proximity are free to rotate with respect to another while maintaining relative surface area and separation distance. A lubricant (such as air or oil) facilitates capacitive surfaces hydrodynamically "floating" on each other. A shunt body is connected electrically in parallel with the bearings of the machine, providing a non-contact or nearly non-contact electrical pathway for (Continued)

damaging high-frequency currents an voltages to be shunted around the mechanical load carrying bearings.

55 Claims, 15 Drawing Sheets

Related U.S. Application Data on Sep. 2, 2014, provisional application No. 62/063,068, filed on Oct. 13, 2014.

(58) Field of Classification Search
USPC .............................................. 310/68 D, 68 R
See application file for complete search history.

(56) References Cited

U.S. PATENT DOCUMENTS

| | | |
|---|---|---|
| 3,904,940 A | 9/1975 | Burrus |
| 4,268,758 A | 5/1981 | Grassmann |
| 4,434,448 A | 2/1984 | Bell et al. |
| 4,511,837 A | 4/1985 | Dolfsma et al. |
| 4,801,270 A | 1/1989 | Scarlata |
| 4,852,140 A | 7/1989 | Dax |
| 5,313,129 A | 5/1994 | Stewart |
| 5,914,547 A | 6/1999 | Barahia et al. |
| 5,988,996 A | 11/1999 | Brookbank et al. |
| 6,030,128 A | 2/2000 | Pontzer |
| 6,091,173 A | 7/2000 | Byrd |
| 6,608,410 B2 | 8/2003 | Sato et al. |
| 6,670,733 B2 | 12/2003 | Melfi |
| 6,819,018 B2 | 11/2004 | Melfi |
| 7,071,589 B2 | 7/2006 | Bramel et al. |
| 7,136,271 B2 | 11/2006 | Oh et al. |
| 7,193,836 B2 | 3/2007 | Oh et al. |
| 2002/0121821 A1 | 9/2002 | Ritter |
| 2003/0057783 A1* | 3/2003 | Melfi ..................... H02K 11/40 310/68 R |
| 2004/0189115 A1* | 9/2004 | Preisinger .............. H02K 11/40 310/68 R |
| 2010/0001602 A1* | 1/2010 | Bossaller ............... H02K 11/40 310/89 |
| 2011/0216466 A1* | 9/2011 | Oh ......................... H02K 11/40 361/221 |
| 2013/0099624 A1 | 4/2013 | Vicars et al. |
| 2013/0270822 A1* | 10/2013 | Brauer ............... H02K 11/0089 290/3 |

FOREIGN PATENT DOCUMENTS

| | | |
|---|---|---|
| WO | WO 2004/036721 A1 | 4/2004 |
| WO | WO 2005/034314 A1 | 4/2005 |

* cited by examiner

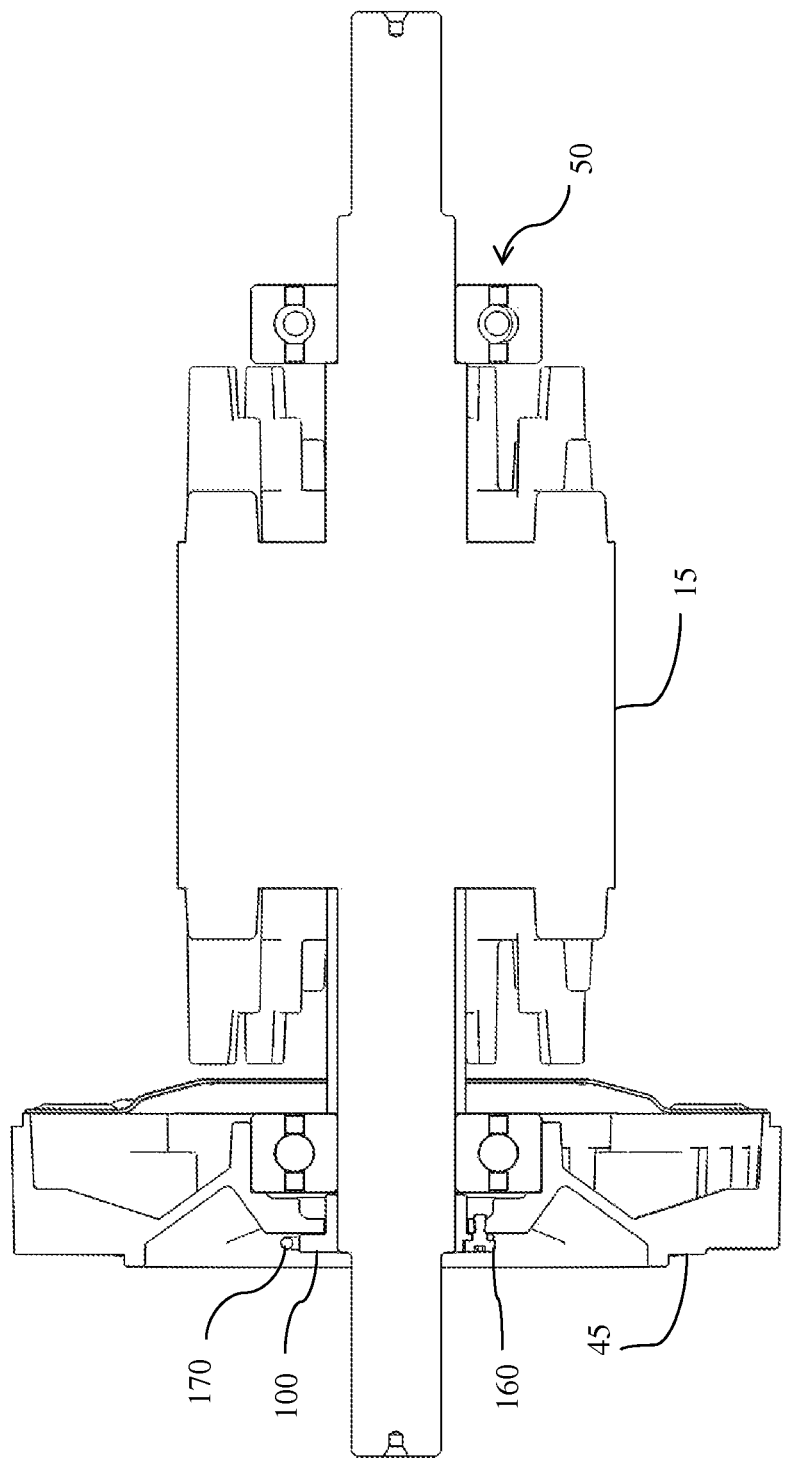

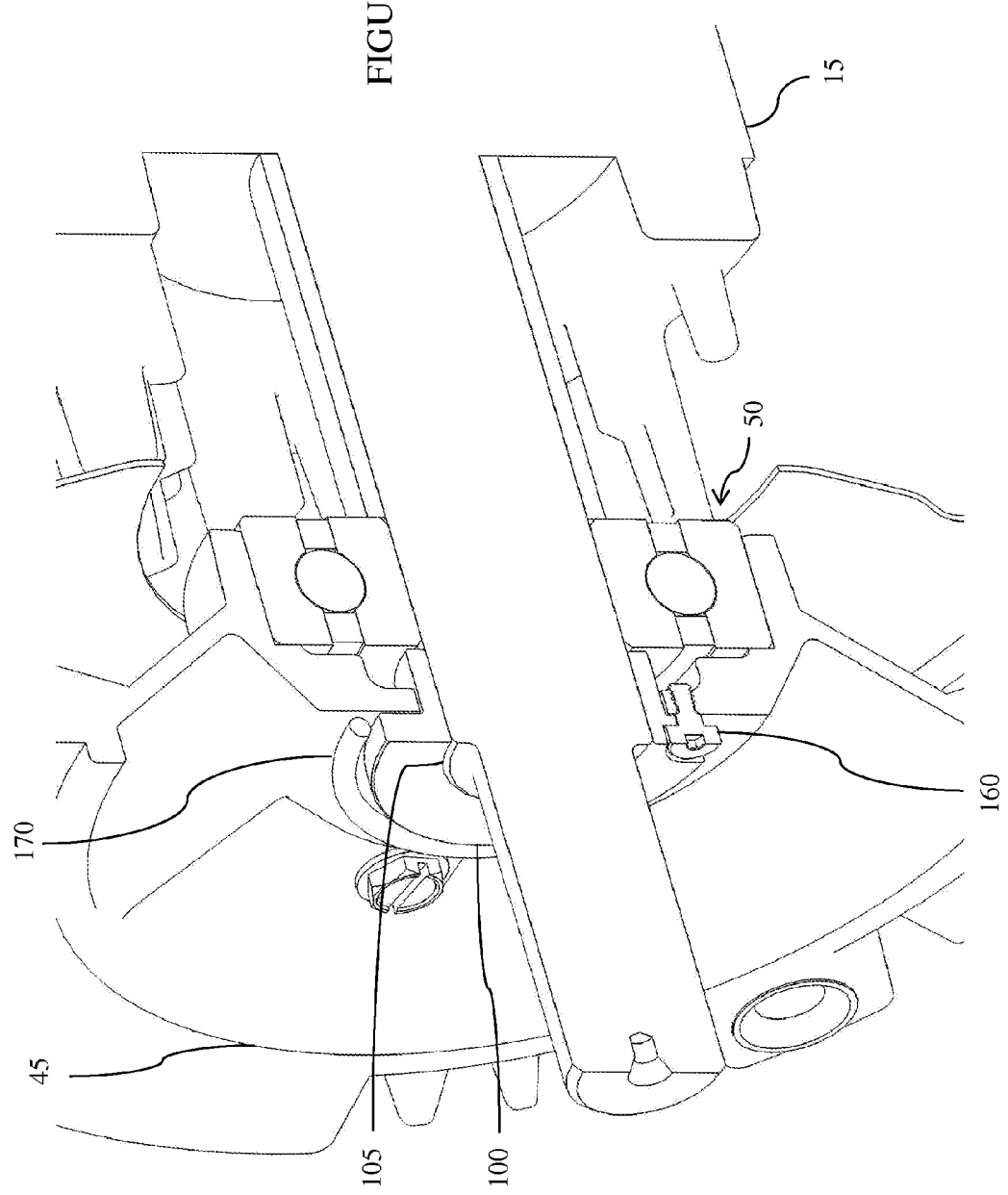

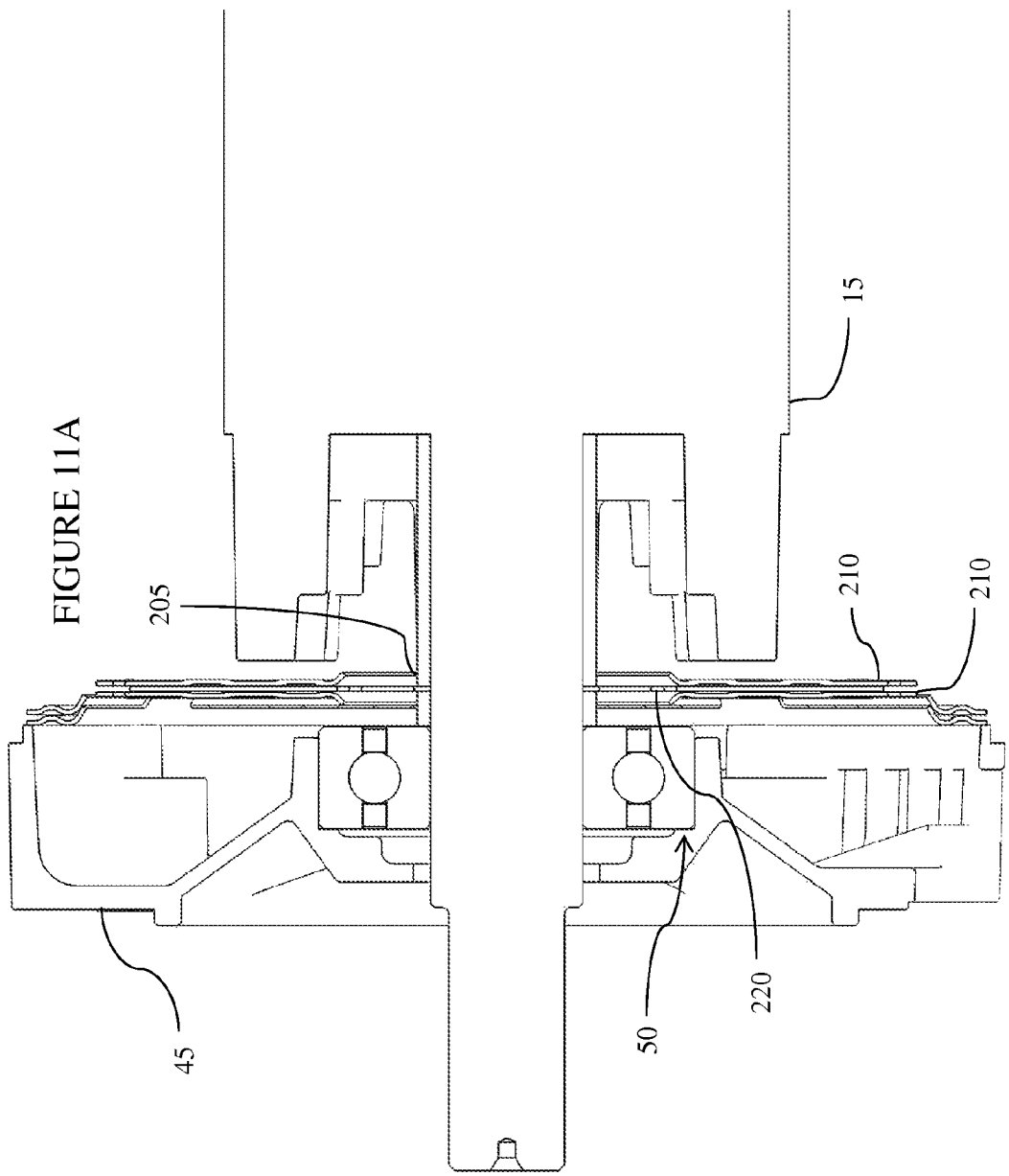

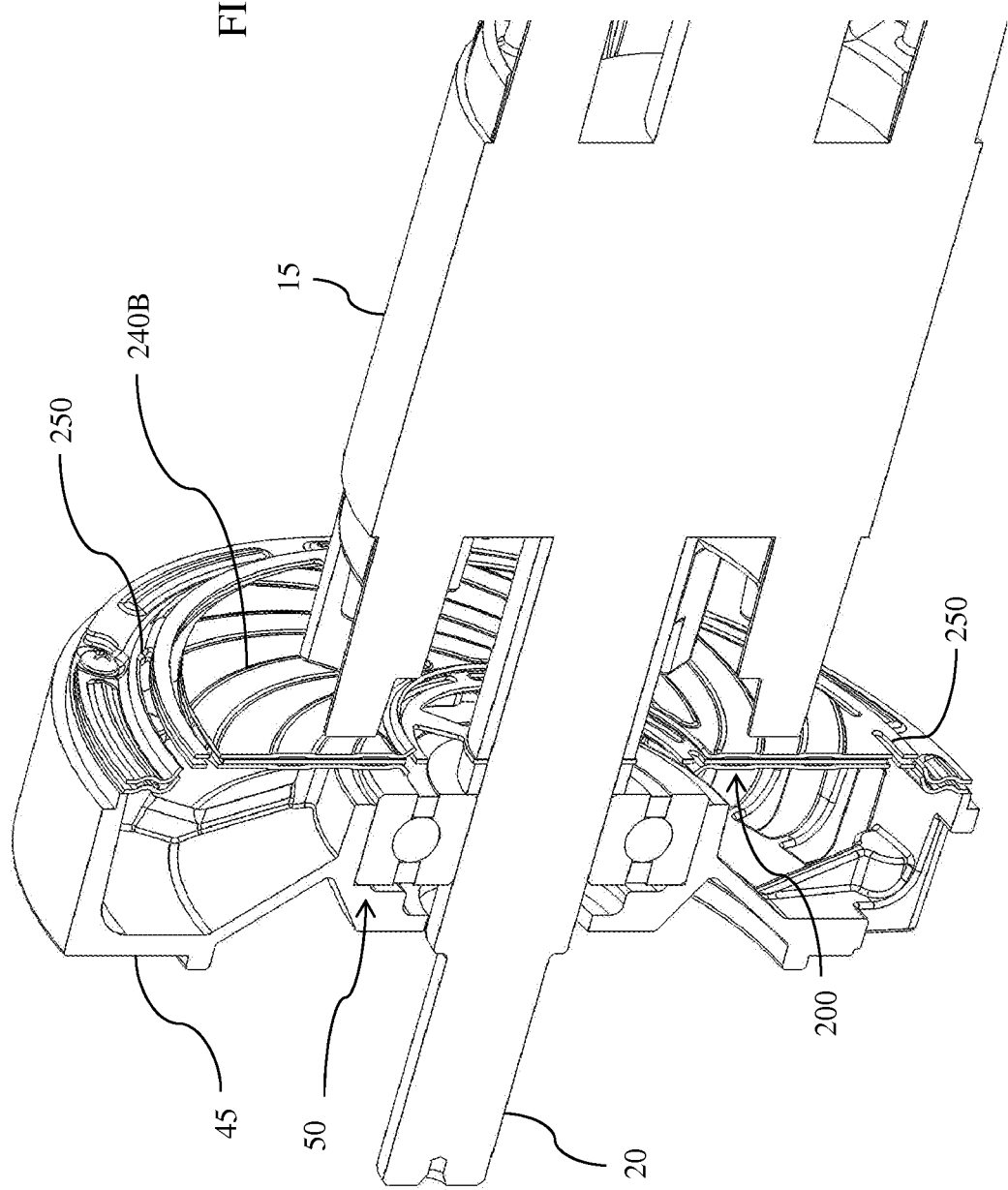

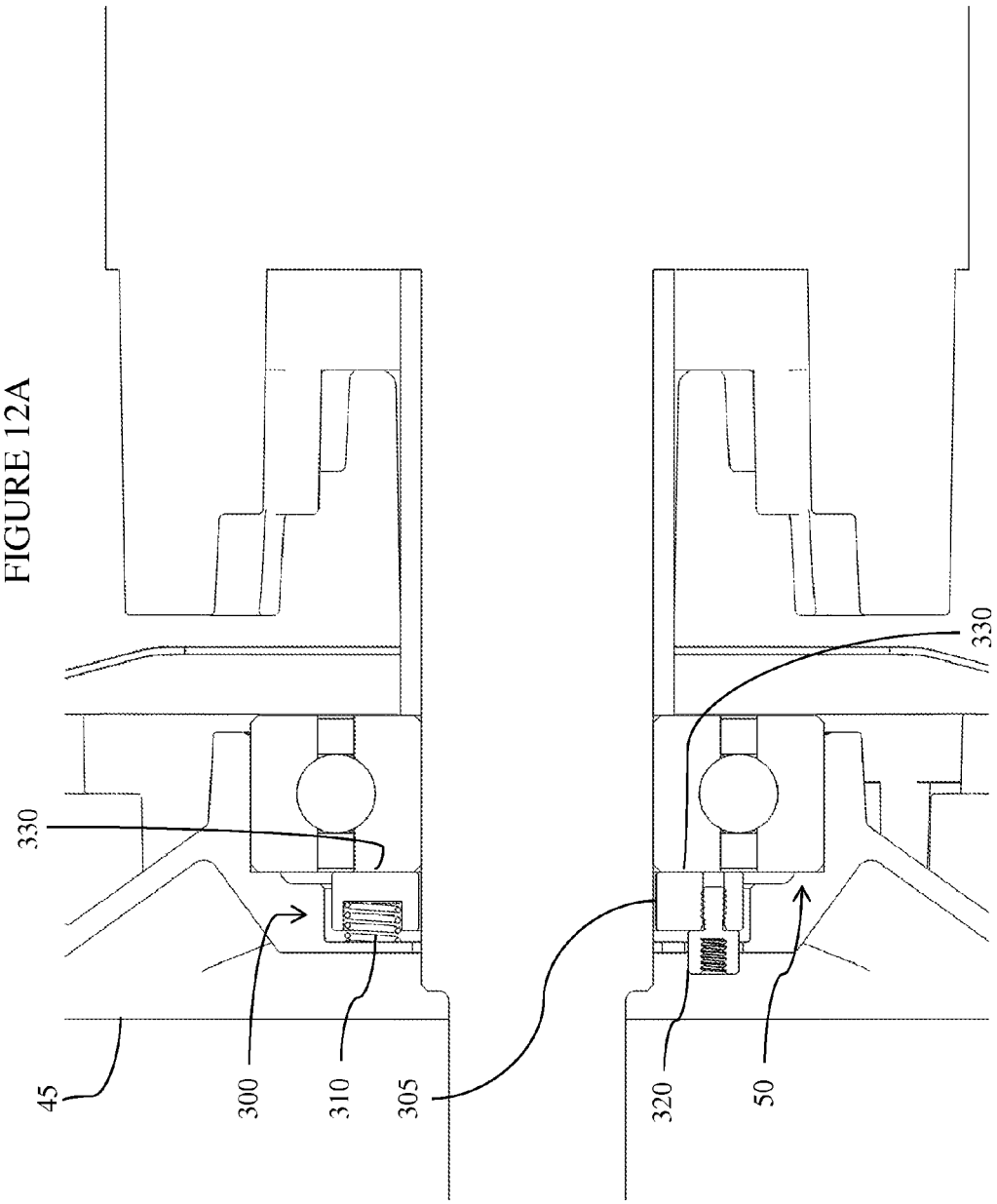

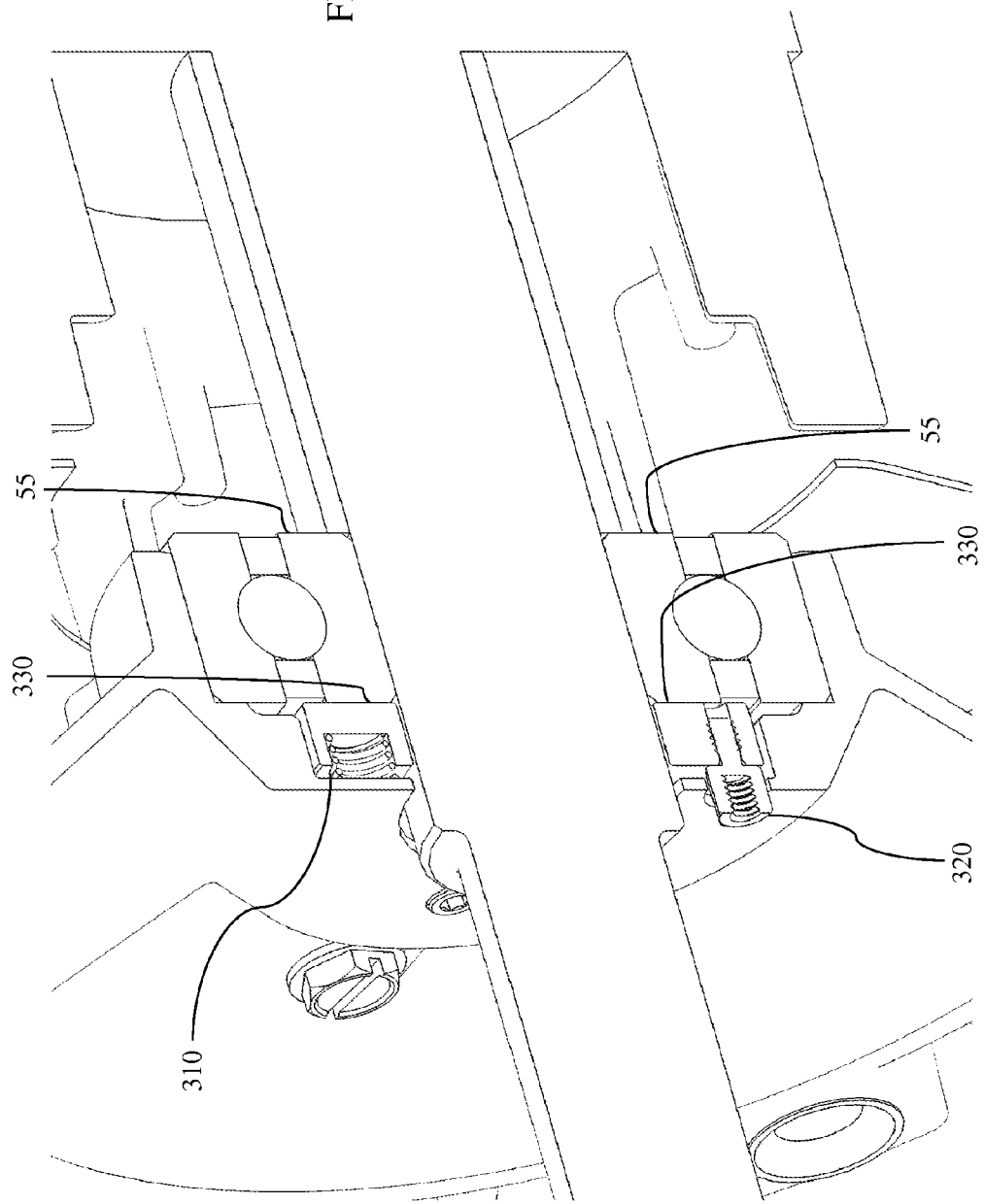

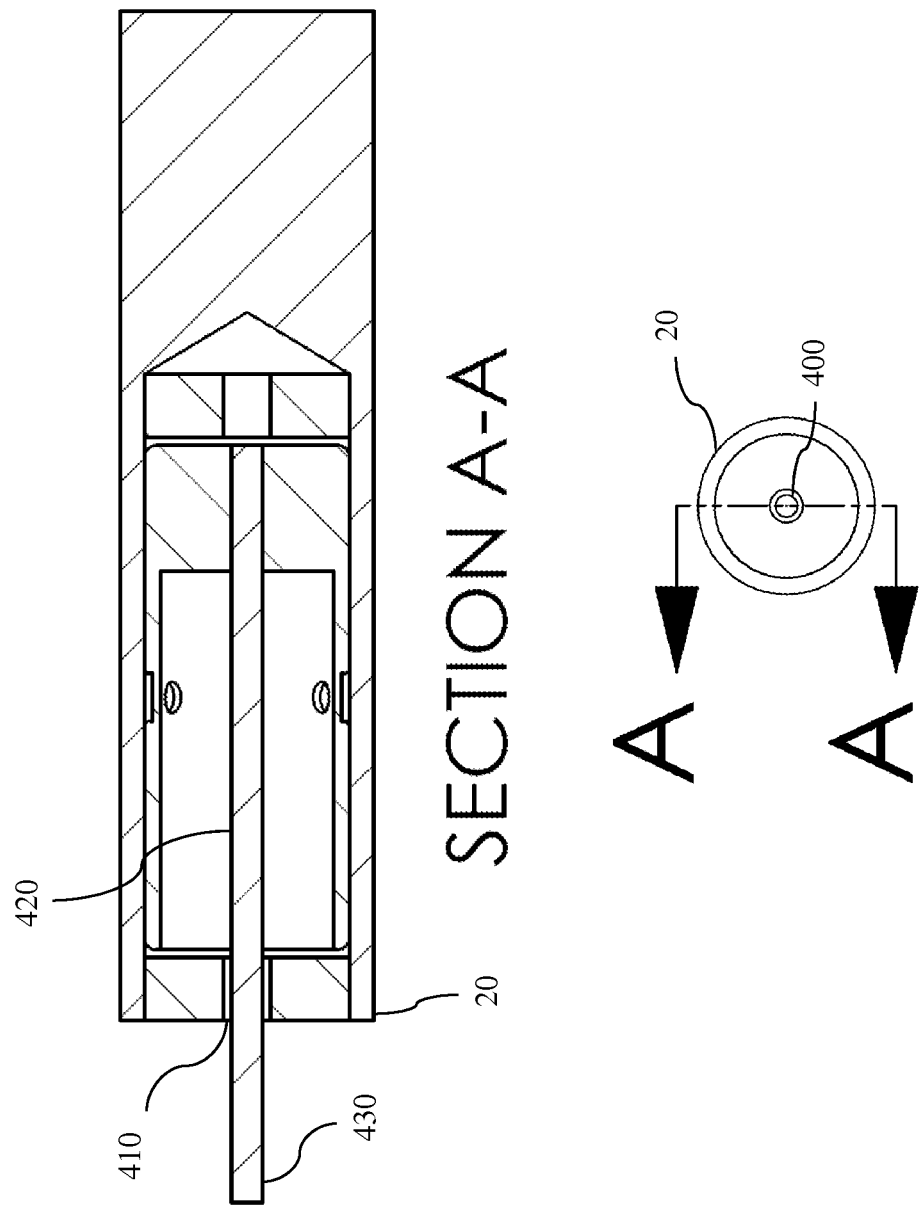

ROTARY CAPACITOR FOR SHUNTING HIGH FREQUENCY BEARING CURRENTS AND REDUCING EMI IN ELECTRIC MACHINERY

CROSS-REFERENCE TO RELATED APPLICATIONS

This application claims priority under 35 USC §119(e) to U.S. Provisional Patent Applications 61/936,190 filed Feb. 5, 2014, 62/044,443 filed Sep. 2, 2014, and 62/063,068 filed Oct. 13, 2014, the entireties of which are incorporated by reference herein.

FIELD OF THE INVENTION

This document concerns an invention relating generally to the use of rotary capacitors in a variety of configurations to form an electrical connection to the shaft of an electric machine to mitigate electric currents flowing through shaft bearings.

BACKGROUND OF THE INVENTION

A motor, generator, gearbox, turbine, impeller, and other devices having (or attached to) rotating or translating shafts may be termed an "electric machine," or collectively termed "electric machinery." Referring to the exemplary electric motor/generator and bearings shown in FIGS. 1A and 1B, electric machine 10 is often connected to an electrical source or load via power electronics 35. Power electronics 35 include switching amplifiers, whose voltages and currents possess high frequency harmonics in addition to the fundamental component. For example, in a variable frequency drive, the fundamental electrical frequency may be 60 Hz, the switching frequency may be 10 kHz, and on/off transition time for the power semiconductors may be 1 µs to 100 ns (1-10 MHz). The higher frequency components, i.e. those above the fundamental, introduce voltages and currents throughout the machine 10 due to parasitic coupling. Parasitic coupling refers to non-desirable yet unavoidable mutual capacitances and inductances between different parts of a machine 10. The influence of this coupling is generally insignificant at the fundamental frequency but is readily apparent at high frequencies. For example, the switching voltage harmonics of a variable frequency drive may interact with the parasitic elements of the electric motor/generator 10 to which it is connected, producing high frequency electric currents that flow through these parasitic pathways, such as through the electrical capacitance of the bearings 50 that support the induction rotor 15 within the stator (i.e., non-moving components that may include a stator frame 25 and stator windings 30). With substantial levels of current in the bearings 50, a substantial high frequency potential difference between the stator 25, 30 and rotor 15 may be established, producing destructive arcs within the bearing 50 itself, as well as producing electromagnetic interference (EMI) from the shaft 20. These high frequency parasitic currents will herein be referred to as "bearing currents," and electromagnetic interference will refer to the interference conducted or radiated by the shaft 20 of the machine 10.

Bearing currents are undesirable due to the adverse wear they cause. In ball bearings 50, for example, the inner raceways 55 and the outer raceways 65, in addition to the balls 60, experience pitting due to the high-current electric pulses that flow through them during an arcing event. During shaft rotation, bearing grease at contact points 70, 75 forms a layer of electrical insulation between the electrically conductive balls 60 and races 55, 65, forming a capacitor. This is represented by variable capacitor $C_B$ in FIG. 1B. When electric current flows through this capacitor, electric potentials develop across the bearing surfaces and can arc, causing pitting. Pitting of the bearing surfaces causes mechanical wear and premature failure of the bearing 50. Bearing failure is catastrophic for electric machinery, and failure will often propagate to systems attached to the machine 10, such as gearboxes, turbines, impellers, etc. To prevent such failures, bearing currents must be mitigated.

Electromagnetic interference may also result from parasitic coupling due to the parasitic voltage on the shaft. Existing solutions largely fall into three categories: 1) use of a brush in contact with the rotor (i.e., a non-stationary part of a machine); 2) bearing insulators; 3) electrical line filters for high frequency harmonics. First, regarding use of a brush, a brush forms a sliding contact on the rotor 15 of the machine 10. This contact exhibits a lower electrical impedance than the bearings 50, and thus bearing currents are shunted around the bearings 50, and the shaft voltage is driven towards zero. However, brushes experience significant mechanical wear and accumulate brush dust over time, requiring periodic maintenance. Second, regarding bearing insulators, methods to isolate the electrical path that bearing currents flow through typically include insulated bearing mounts or bearings with insulating balls. Structurally identical to steel bearings, ceramic bearings use ceramic balls and/or raceways rather than steel to support a rotating shaft. The use of a ceramic material makes the bearing electrically insulating, preventing the flow of currents through them. However, drawbacks of this system include the higher purchase price for ceramic bearings, and the need for significant downtime/effort to undertake the difficult task of retrofitting existing/deployed systems. And third, regarding line filters, an electrical line filter may be placed on the terminals of the electric machine 10. These filters use inductive, capacitive, and/or resistive elements to form a network that dissipates high frequency content before it can flow through the electric machine 10. Line filters can be expensive and bulky, deterring their deployment in many applications. Additionally, line filters are most often passive (i.e., have constituent components with fixed values), thereby limiting the adaptability of line filters in a changing environment.

What is needed is a device and method that will simultaneously reduce or mitigate bearing currents and electromagnetic interference without the above drawbacks, such as the need for periodic maintenance, higher costs, and limited adaptability.

SUMMARY OF THE INVENTION

The invention, which is defined by the claims set forth at the end of this document, is directed to rotary capacitors which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

The rotary capacitor assemblies shown in the figures include a shunt body that can be placed about or within a shaft 20 of a rotor 15 in an electric machine 10 (e.g., motors, generators, gearboxes, or other equipment attached to a motor). The shunt body may take different forms, such as an external hydrodynamic sleeve 100 (FIGS. 2-4, 5A, 5B, 10A, 10B), a set of concentric disks 200 (FIGS. 6, 7, 11A, 11B), an axial thrust body 300 (FIGS. 12A, 12B), and an internal hydrodynamic cylindrical member 400 (FIG. 13). The shaft 20 extends through a central opening 105, 205, 305 formed in the shunt body 100, 200, 300, or the shunt body 400 is placed into the shaft 20. The shunt body 100, 200, 300, 400 is electrically connected in parallel with a bearing 50, 50A, 50C on the shaft 20. When the rotor 15 is active (e.g., when the shaft 20 is rotating), the shunt body 100, 200, 300, 400 forms a capacitor that can shunt high-frequency bearing current (for example, at 1 kHz or greater) and reduce electromagnetic interference in the electric machine 10. The shunt body 100, 200, 300, 400 may be connected to a stator frame 25 of the electric machine 10, or to an active electronics circuit 500 that is configured to control the potential difference between the rotor 15 and the stator frame 25. The potential difference between the rotor 15 and the stator frame 25 is minimized to keep the voltage across the bearing low or at zero.

Machine bearings provide a pathway for damaging high-frequency currents injected into the machine by a variable frequency drive. Exemplary versions of the present invention provide a non-contact method of reducing or mitigating the flow of high frequency electrical currents through the bearings of electric machinery. The rotary capacitor assemblies extend the life and performance of bearings by shunting such currents around them, thereby minimizing electrically-inflicted mechanical wear that would occur from electrical discharges across the precision surfaces of the bearings. Moreover, lowering the high frequency parasitic voltage present on the rotor reduces electromagnetic interference. Further advantages and features of the invention will be apparent from the remainder of this document in conjunction with the associated drawings.

BRIEF DESCRIPTION OF THE DRAWINGS

FIG. 4 is a cross-sectional view of a first version of a sleeve 100 that is not integrated with a bearing 50; it shows a metal or conductive casing 120 about a porous lubricant-impregnated bushing 140, with a lubricant-soaked wicking material 130 between the casing 120 and the bushing 140.

FIG. 5A is a cross-sectional view of a sleeve 100A integrated with a ball bearing 50A via a rigid membrane 150A.

FIG. 5B is a cross-sectional view of a sleeve 100B integrated with a ball bearing 50B via a flexible membrane 100B.

FIG. 10A is a cross-sectional side view of an exemplary capacitor assembly with a sleeved form factor 100. FIG. 10B is a cross-sectional perspective close-up view of the capacitor assembly of FIG. 10A.

FIG. 11A is a cross-sectional side view of an exemplary capacitor assembly with a parallel disk form factor 200. FIG. 11B is a cross-sectional perspective close-up view of the capacitor assembly of FIG. 11A.

FIG. 12A is a cross-sectional side view of an exemplary capacitor assembly with an axial thrust body form factor 300. FIG. 12B is a cross-sectional perspective close-up view of the capacitor assembly of FIG. 12A.

FIG. 13A is a cross-sectional side view of an exemplary capacitor assembly with a cylindrical member 400 bored into the shaft 20.

DETAILED DESCRIPTION OF PREFERRED VERSIONS OF THE INVENTION

Figure 1A:
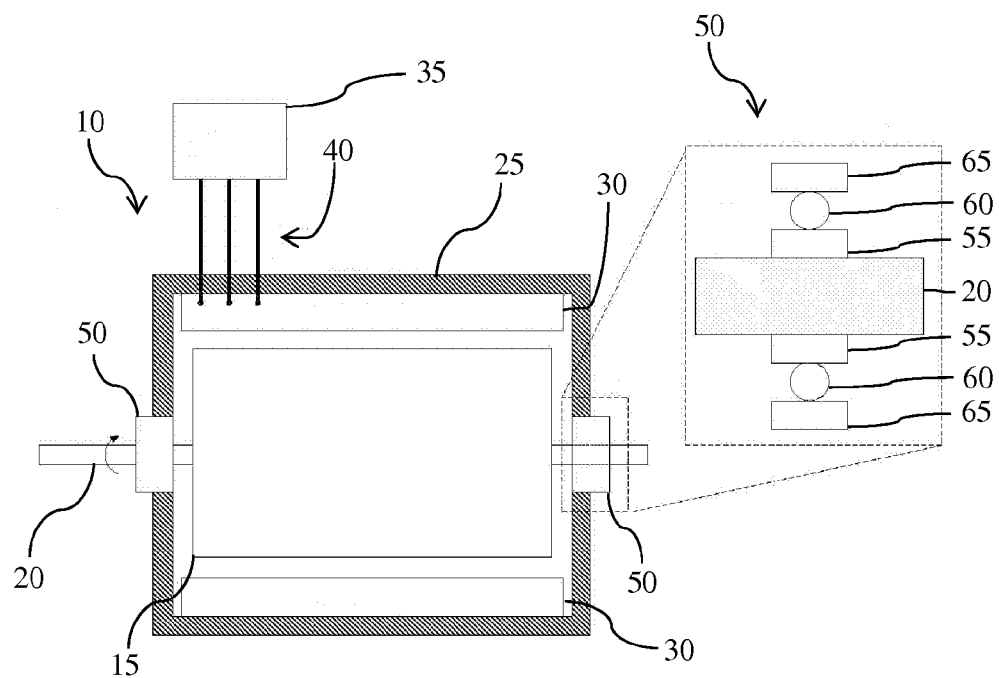
FIG. 1A is a cross-sectional representative view of an exemplary electric motor/generator (i.e., an electric machine 10), with a magnified view of a bearing 50.
Figure 1B:
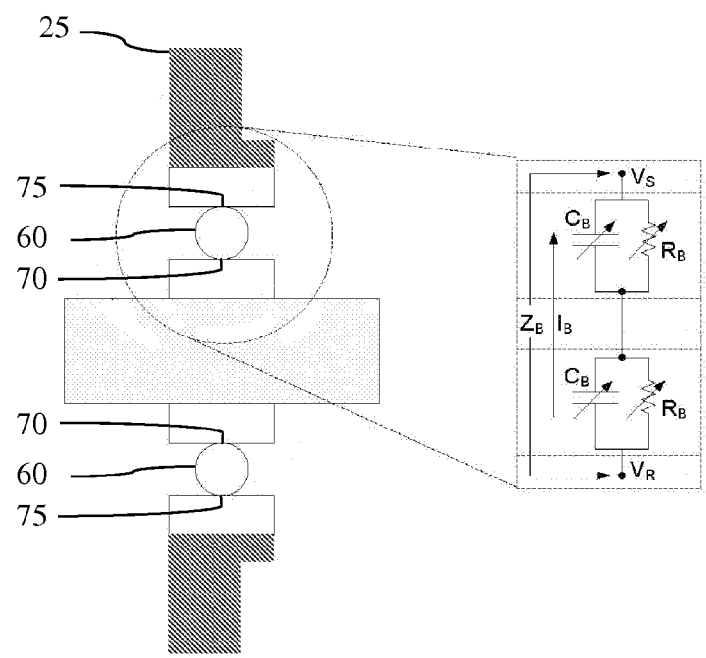
FIG. 1B is a cross-sectional representation of a ball bearing 50 that can be used to support the shaft 20 of the electric machine 10 of FIG. 1A, along with a lumped element representation of the ball bearing 50.

Continuing the discussion started in the "Summary," in FIGS. 1A and 1B, the rotor 15 of the electric machine 10 is supported by the stator frame 25 via ball bearings 50 at each end of the machine 10. The stator frame 25 also supports the stator windings 30 that surround the rotor 15. The magnified view of the ball bearing 50 shows that the bearings 50 include inner and outer races 55, 65 separated by balls 60, which are typically made of a hard conducting material such as steel. The inner race 55 of the ball bearing 50 is pressed against the shaft 20, and the outer race 65 rests within one end of the stator frame 25. The races 55, 65 are held concentric by the balls 60, allowing the inner race 55 to rotate. A power electronic (variable frequency) drive 35 provides line frequency 40 (such as 60 Hz) power, but also supplies high frequency components that create undesirable bearing currents.

The points at which the balls 60 make contact with the inner and outer races 55, 65 are referred to as contact points 70, 75. If the shaft 20, stator frame 25, and ball bearings 50 are made of a conducting material, the contact points 70, 75 make an electrical connection between the stator frame 25 and rotor 15 assemblies of the machine 10 when the balls 60 and races 55, 65 are not separated by grease; this occurs when the shaft 20 is stationary, or during significant mechanical loads during operation. When the shaft 20 is rotating, bearing grease flows between the balls 60 and races 55, 65, electrically separating the balls 60 from races 55, 65 and forming a capacitor ($C_B$). A lumped element representation (FIG. 1B) of this connection includes a series-parallel combination of variable resistors ($R_B$) and capacitors ($C_B$); this network illustrates bearing impedance ($Z_B$). The bearing impedance ($Z_B$) may vary with temperature, lubricant, shaft speed, age, or other variables, resulting in general variability of constituent components. The parasitic voltages on the stator frame 25 and rotor 15 create a potential difference across the bearing impedance ($Z_B$), resulting in bearing currents ($I_B$) and electromagnetic interference. The reverse can also be true, wherein bearing currents may flow as a consequence of the power electronic drive's 35 connection to the electric machine 10, resulting in a potential difference across the bearing impedance. High frequency bearing currents caused by high frequency switching in the variable frequency drive 35 can charge the bearing capacitance to high enough potentials that there is "contact" through electrical breakdown (i.e., arcing through the grease). Arcs occurring through the bearing grease (which are another type of bearing current) also cause degradation of the bearing 50. This same process also applies to gears, couplings, or sprockets attached to the shaft 20.

Similar to the operation of brushes, the exemplary capacitor assemblies described here provide an alternative path for bearing currents to flow, i.e. shunting the current around the ball bearing 50 to protect it. In the case of electromagnetic interference, shaft 20 voltage is "shorted" at high frequencies via the shunt body 100, 200, 300 of the rotary capacitor assembly. However, unlike a brush, the rotary capacitor assembly accomplishes current/voltage shunting without contact via capacitive coupling between the rotor 15 and stator frame 25. Capacitive coupling provides a low impedance pathway between the stator frame 25 and rotor 15 at high frequencies.

Figure 2:
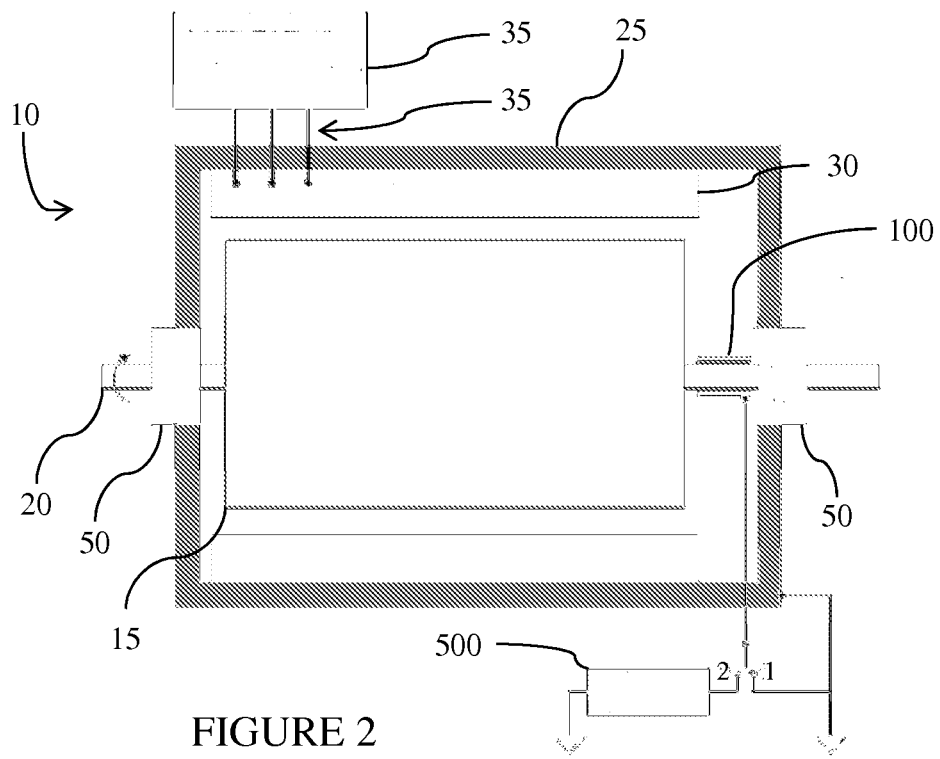
FIG. 2 is a cross-sectional representative view of one exemplary version of an electric motor/generator (machine 10) with a shunt body 100 having a sleeved form factor.
Figure 3:
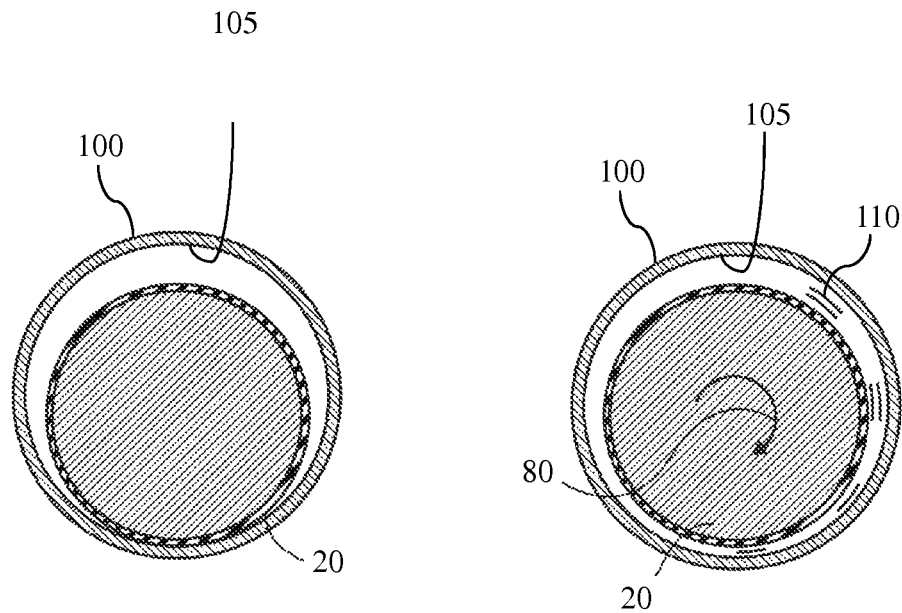
FIG. 3 is an end view of the sleeved shunt body 100 of FIG. 2 seated around the shaft 20 of the electric machine 10. During standstill (on left), the shaft 20 may be in contact with the sleeve 100 (along the bottom as shown, or elsewhere depending on orientation); this results because the sleeve 100 may not provide mechanical support of the shaft 20 in the radial direction. When the shaft 20 rotates 80, the shunt body 100 "lifts off" from the shaft 20 due to hydrodynamic bearing action

To help illustrate this, FIG. 2 is a cross sectional view of an electric motor/generator (machine 10) with the sleeved shunt body 100 positioned at one side (the end bell 45) of the machine 10. The sleeved shunt body 100 makes a capacitive connection between the rotating shaft 20 of the machine 10 and the stator frame 25. FIG. 3 helps illustrate the manner in which lubricant facilitates hydrodynamic/journal bearing action during rotation, floating the sleeve 100 on the shaft 20. The sleeve 100 includes one or more cylindrical conducting surfaces that are concentric to a surface on the shaft 20. The sleeve 100 may be placed on the rotor 15 and glide on a cushion of lubricant 110 (as a brass or bronze bushing on the electric shaft 20 would). When the shaft 20 rotates, the sleeve 100 moves into a concentric position and maintains a gap with the shaft 20. The sleeved shunt body 100 diverts currents around the ball bearings 50 by lowering impedance to reduce shaft voltage below a bearing current threshold at a given frequency in the machine 10. This low impedance also lowers the shaft 20 voltage, reducing electromagnetic interference. As shown, the shunt body 100 may be connected to the frame or in series with an active electronic circuit 500, further discussed below.

The hydrodynamic sleeved shunt body 100 thus makes an electrical connection between the rotor shaft 20 of the machine 10 and a stationary stator frame 25. The conducting sleeve 100 floats on lubricant 110 during rotation to form a parallel plate capacitor between the stator frame 25 and the rotor 15. The sleeve 100 forms a parallel plate capacitor with the rotor shaft 20 because of its relatively large surface area (compared to the ball bearings 50) and because of its proximity to the shaft 20 itself. Because the hydrodynamic sleeve shunt body 100 is nominally non-contact, there is no maintenance required as mechanical wear/friction (associated with brushes) has been virtually eliminated. Also, the hydrodynamic sleeved shunt body 100 does not bear the mechanical load as the ball bearings 50 do; it simply floats on the shaft 20 to maintain its position.

Figure 4:
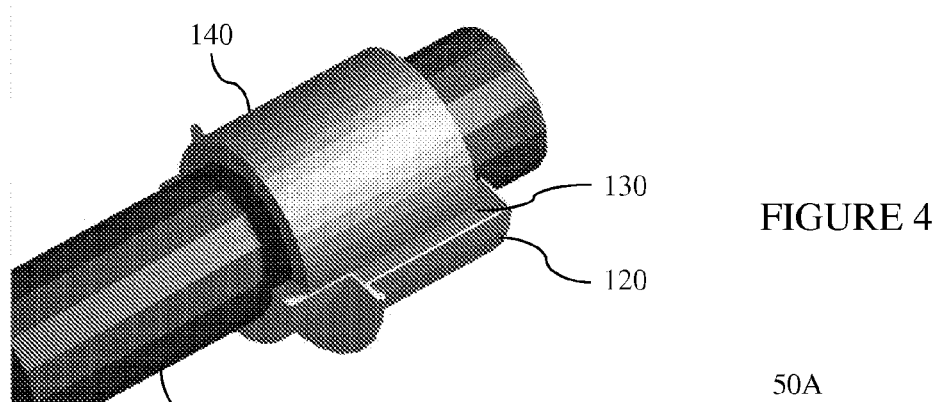
FIGS. 4, 5A, and 5B illustrate three versions of the sleeved shunt body.

FIG. 4 is a three-dimensional rendering of one version of the hydrodynamic sleeved shunt body 100 wherein a porous bronze bushing 140 is pressed inside a metal casing 120 that contains a lubricant soaked wicking material 130, such as felt saturated with oil. The oil wicks gradually over time through the bushing 140 into the space between the bushing 140 and the rotor shaft 20, lubricating it for hydrodynamic action and yielding maximum capacitive coupling. The lubricant may also increase capacitive coupling via its relative permittivity. The lubricant 110 preferably has a permittivity of greater than 2 to enhance shunt capacitance. The lubricant in the gap may additionally be protected from degradation by placing any variety of shaft 20 seals (e.g. simple felt) at the rotor shaft 20-sleeve 100 interface, increasing the lifespan of the unit. The gap fluid may be slightly conductive, either intentionally or becoming conductive over time; this is reflected by the variable resistance in parallel to the shunt capacitor in FIGS. 8A-8C (further discussed below)

Figure 5A:
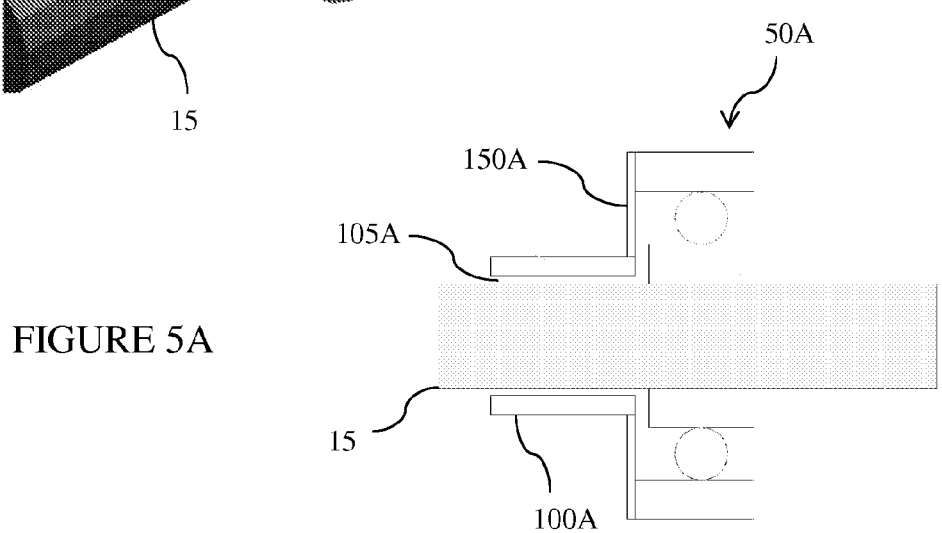
Figure 5B:
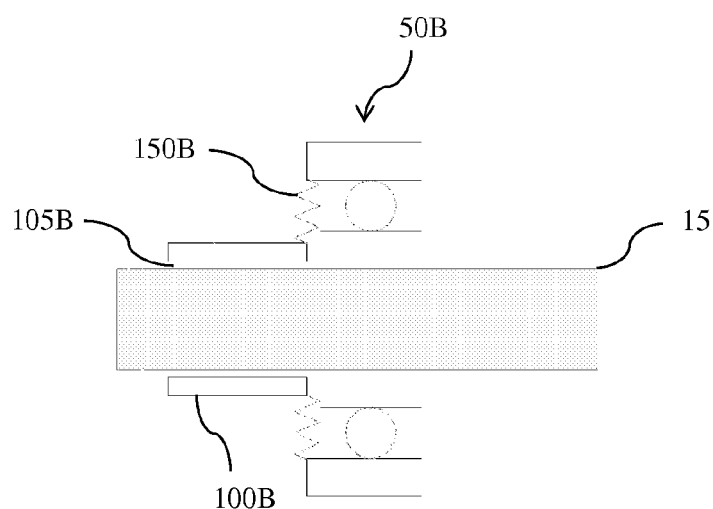

Advantageously, the sleeve 100 may be fixed to the frame or end bell 45 of the machine 10 via rigid or flexible means; a flexible mount tends to enhance hydrodynamic performance. In FIGS. 5A and 5B, the sleeved shunt body 100 form factor may be integrated directly into the bearing outer race 65. In FIG. 5A, the ball bearing 50A is integrated with the sleeved shunt body 100A via a rigid electrical and structural connection 150A directly between the sleeve 100A and the outer race 65 of the bearing 50A. That is, the bearing 50A can be made to possess a sleeved shunt body 100A to dwarf the capacitance of the mechanical load-bearing ball bearings 50A. FIG. 5B is nearly identical to FIG. 5A, except the sleeve 100B is attached via a flexible, rather than rigid, mounting membrane 150B to the bearing 50B or machine frame 25 for better hydrodynamic action (and enhanced gap maintenance). This "integrated" approach allows the bearing 50A, 50B to possess a hydrodynamic sleeved shunt body 100A, 100B from the start, eliminating the need for a retrofit. These features increase capacitive coupling and lower the high frequency impedance between the stator frame 25 and rotor 15, ultimately reducing bearing currents.

Figure 6:
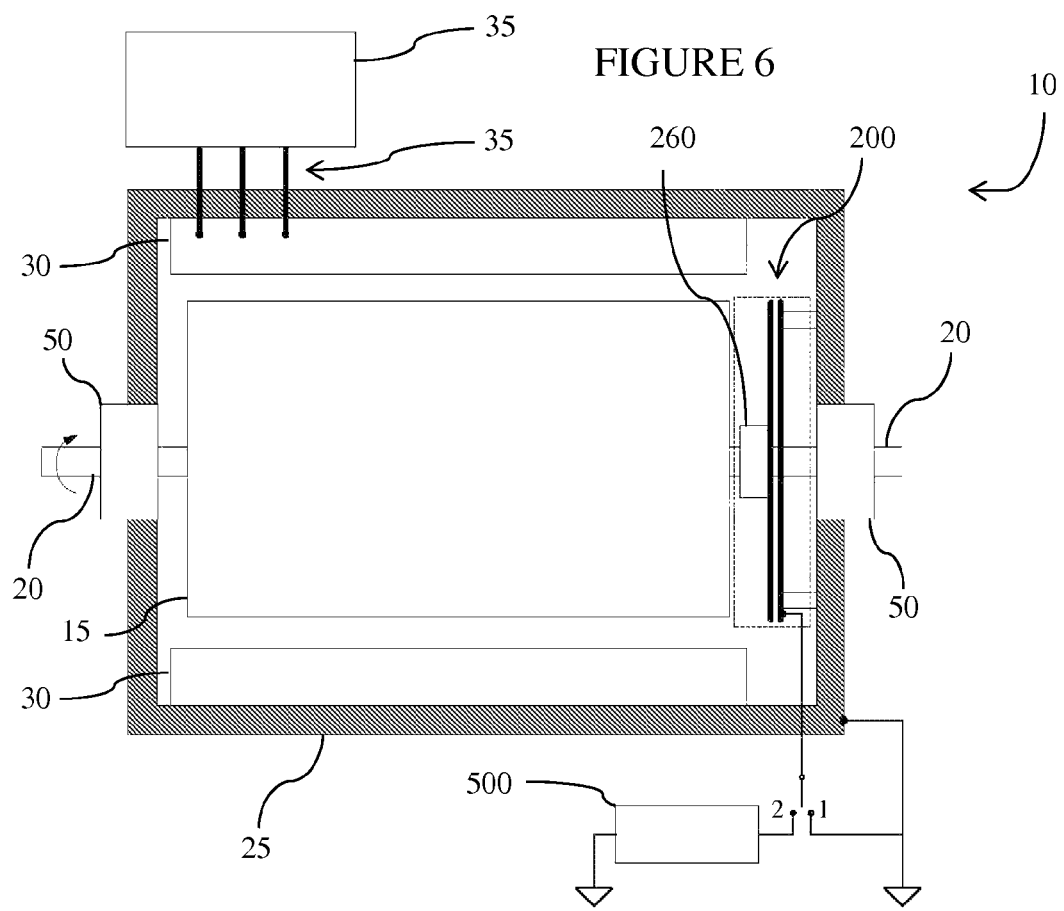
FIG. 6 is a cross-sectional view of an alternative exemplary capacitor assembly that includes an axial flux (parallel plate/disk) rotating capacitor 200 inside an end bell 45 of an electric machine 10.
Figure 7:
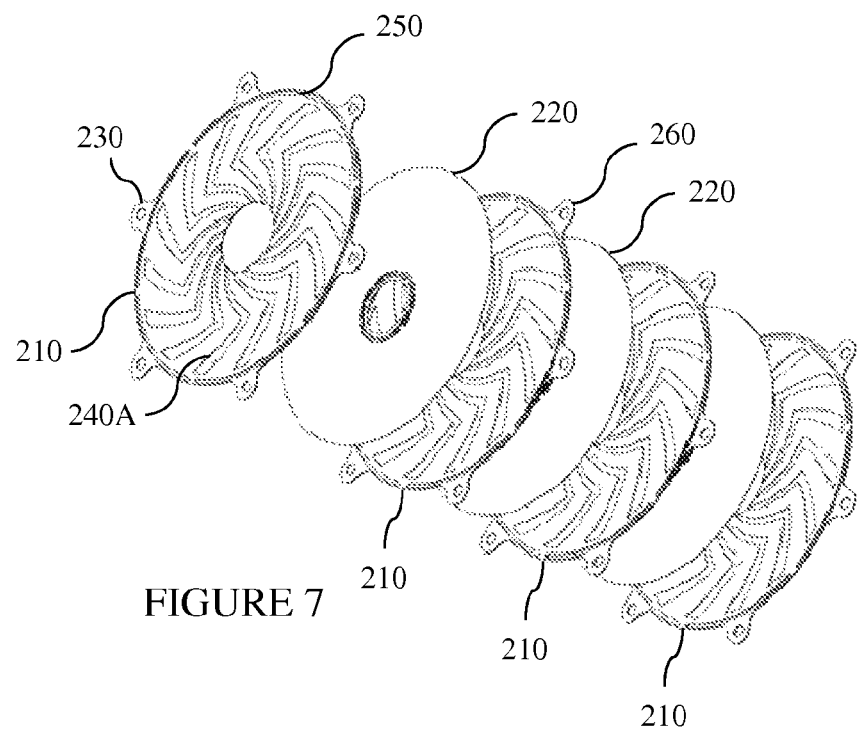
FIG. 7 is a cascade of exemplary parallel disks 200 with rotor disks 220 and stator disks 210 that have a "herringbone" groove pattern 240A.

In FIGS. 6 and 7, the shunt body 200 has a hydrodynamic flexing disk configuration that includes stator disks 210 and rotor disks 220 that maintain a gap via hydrodynamic action; this configuration effectively yields identical electrical performance as with the sleeve 100. The gap between the disks 210, 220 may be rigidly maintained. But preferably, flexures 250 are formed in stator disks 210 to give the disks 210, 220 freedom of motion for alignment, helping ensure the gaps between disks 210, 220 are maintained. With both the rigid disks (not pictured) and the hydrodynamic flexing disks 210, the capacitive connection between the rotating shaft 20 of the machine 10 and the frame 25 diverts currents around the bearings 50 by lowering impedance to reduce shaft voltage below a bearing current threshold at a given frequency than the ball bearing 50 pathway. As with the sleeved capacitor assembly (with shunt body 100), the parallel disk configuration (with shunt body 200) may be connected to the frame 25, or in series with an active electronic circuit 500. FIG. 7 shows an optional cascade of hydrodynamic flexing disks having three rotor disks 220 sandwiched by four stator disks 210. The stator disks 210 include grooves 240A or flutes in the surface thereof for channeling fluid into the gap during rotation of the shaft 20; in FIG. 7, the stator plates 210 have a herringbone groove pattern. The stator disks 210 may be secured to the end bell 45 of the machine 10 via fastening members 260.

The effectiveness of the rotary capacitor assembly depends in part on the amount of shunting capacitive coupling that can be provided. Coupling may be maximized by increasing the surface area and decreasing the gap between the shunt body 100, 200 and the rotor shaft 20. The surface area of the shunt body 100, 200 may be increased by (for example) adding an electrically conducting hub 260 that connects to the rotor shaft 20 to increase the diameter of the shaft 20 and the shunt body 200. Additionally, the sleeve 100 (for example) may be cut longer for a given shaft diameter for further surface area. Gap reduction is accomplished by floating the sleeve 100 hydrodynamically on a liquid or gas lubricant, e.g. air or oil, as the rotor shaft 20 rotates. This provides a self-acting hydrodynamic bearing/bushing. Typically, the hydrodynamic sleeved shunt body 100 and shaft 20 surfaces (FIGS. 2-7) should be as close as possible without making contact, preferably less than one millimeter for smaller shaft diameters, and less than five millimeters for larger shaft diameters. Hydrodynamic journal bearing action can facilitate minimal gaps and reduce physical contact and wear.

Figure 8A:
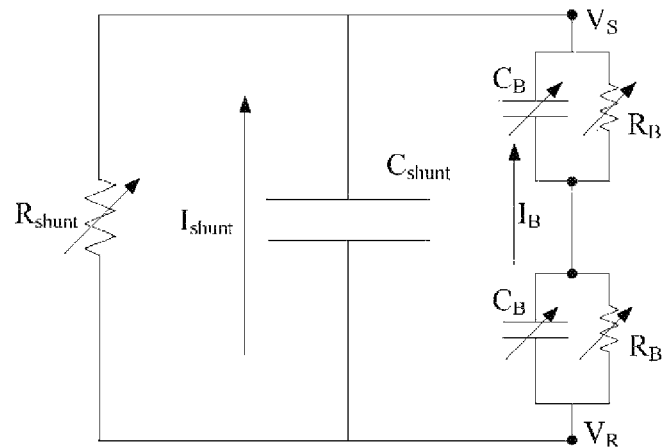
FIG. 8A is a lumped circuit element circuit representation of a rotary capacitor assembly in parallel (shunt) to the bearing impedance. It corresponds with configuration "1" of FIGS. 2 and 6; that is, the shunt capacitance is directly across the bearing impedance.
Figure 8B:
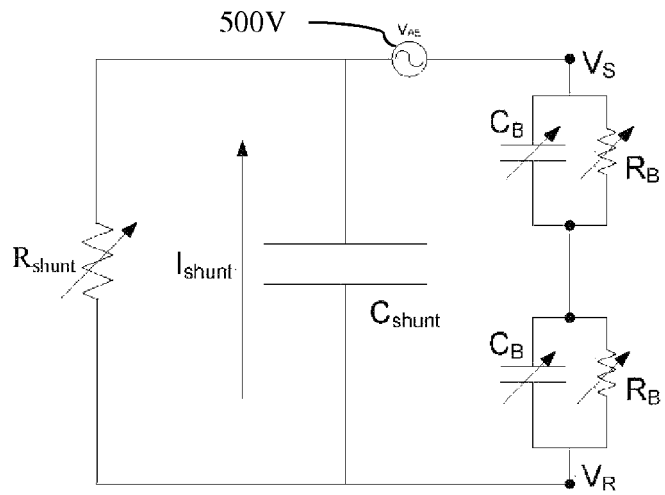
FIGS. 8B and 8C show the lumped circuit element representations of the sleeved shunt body 100 in series with an active electronic circuit 500 that is capable of supplying a voltage 500V (FIG. 8B) or a current 500I (FIG. 8C). These correspond with configuration "2" of FIGS. 2 and 6; that is, the shunt capacitance in series with the active electronic circuit 500 is directly across the bearing impedance. The rotary shunt capacitor and voltage source are in parallel to the bearing impedance.
Figure 8C:
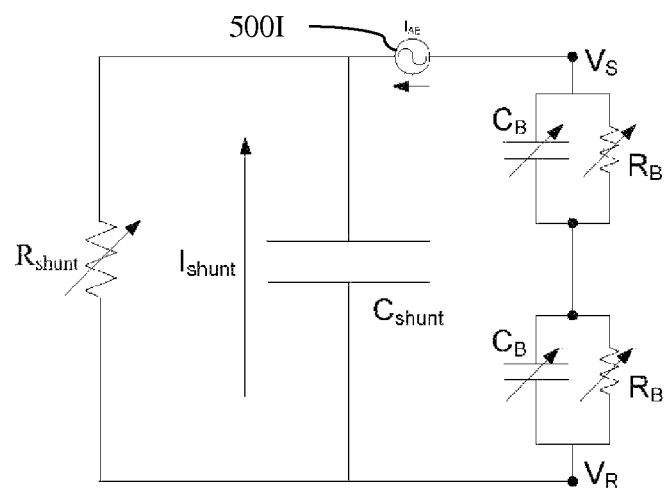

The effective lumped element model of the electrical behavior is illustrated in FIG. 8A, which represents the switch in position "1" of FIGS. 2 and 6. The capacitive shunt is in parallel with the bearing impedance. Due to the high capacitive coupling, the shunt path provides much lower impedance than the bearings 50 at high frequencies, and the potential difference across the stator frame 25 and rotor 15 is reduced. The lower potential difference across the bearing impedance lowers the bearing current as described by Ohm's law, thereby preventing premature failure of the bearing 50. Conversely, when currents through the various parasitic capacitances of the electric machine 10 are caused directly by the high frequency switching of the variable frequency drive 35, the rotating capacitor (e.g., sleeve 100 or plates 200) provides an alternative path for these currents. Due to the higher total capacitance between $V_S$ and $V_R$ (i.e., between stator voltage and rotor voltage), the bearing voltage ($V_S$-$V_R$) is reduced, preventing damaging electric arcs from occurring through the grease inside the bearing 50. This same voltage reduction mechanism also reduces electromagnetic interference.

In cases where the environment is exceedingly variable, it may be advantageous to insert an active electronic circuit 500 in series with the shunt (FIGS. 8B and 8C), as represented by position "2" of FIGS. 2 and 6. An active electronic circuit 500 can sense the current through capacitive shunt or the voltage on the stationary plate. This feedback allows the active electronic circuit 500 to inject voltage (FIG. 8B) or current (FIG. 8C) into the shunt capacitor, thereby regulating the high frequency potential across the bearing impedance to zero under any varying conditions. The voltage or current can be injected in proportion to electrical voltages or currents injected from other parasitic electrical paths to the moving component (i.e., the rotor 15) of the electric machine 10.

Figure 9:
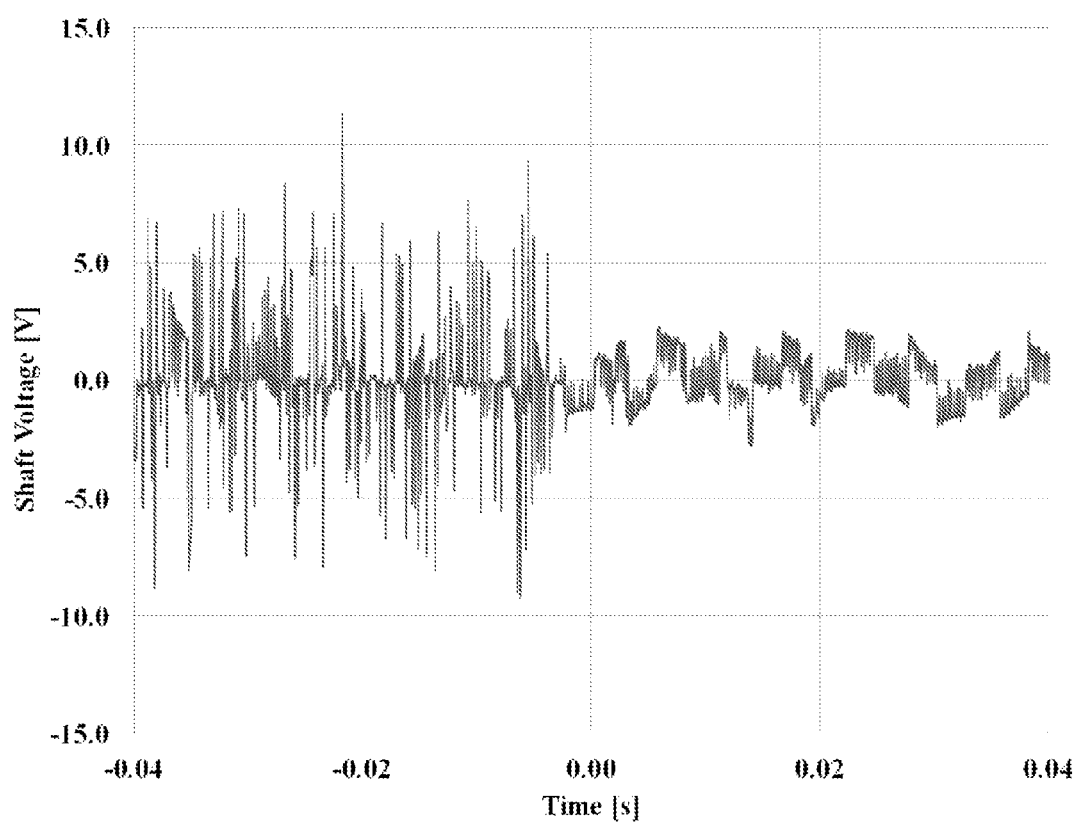
FIG. 9 is a graph of shaft voltage versus time showing shaft voltage without capacitive shunting on the left (i.e., before time zero), and shaft voltage with capacitive shunting on the right (after time zero) using (for example) shunt body 100, 200, 300.

As traced in FIG. 9, the exemplary rotary shunt capacitors significantly reduce shaft voltage. The voltage readings shown on the left side of the graph represent a rotor 15 without capacitive shunting. On the right side are voltage readings with capacitive shunting. That is, capacitive shunting is connected just before zero time (i.e., t=0). Here, capacitive shunting is shown to provide an approximately five-fold reduction in peak-to-peak shaft voltage.

Referring to the exemplary hydrodynamic sleeved shunt body 100 represented in FIGS. 10A and 10B, a fastener 160 connects the shunt body 100 to the frame 25 or "housing" (e.g., the end bell 45) of the machine 10, and helps keep the sleeve 100 from spinning. The fastener does not prohibit the hydrodynamic sleeved shunt body 100 from lifting off of the shaft 20 and floating thereon when the shaft 20 is rotating. The sleeve 100 is preferably impregnated with an oil-based lubricant 110, but it may also function with air or grease from the bearing 50 as non-conducting (or relatively minimally conducting) lubricant. The sleeved shunt body 100 makes a capacitive connection between the rotating shaft 20 of the machine 10 and a stationary frame of reference 25 via a capacitive interface between the sleeve 100 and the shaft 20. Optionally, a separate grounding wire 170 may be extended from the shunt body 100 to the end bell 45.

Referring to FIGS. 11A and 11B, the exemplary hydrodynamic flexing disk shunt body 200 is formed from a set of stacked disks 210, 220 which can be cascaded depending on the application (as shown in FIG. 7). The disked shunt body 200 is well-suited for relatively larger motors. The disks 210, 220 can be made of anodized aluminum (i.e., aluminum coated with an insulator) or uncoated (bare) aluminum, but preferably at least one is anodized to reduce galling between bare aluminum disks; for example, stator disks 210 can be bare while rotor disks 220 can be anodized. Here, two stator disks 210 are sandwiched around a smooth rotor disk 220. The disks 210, 220 capacitively shunt currents from the rotor shaft 20 to the frame to protect the bearings 50. Slits cut into the stator disks 210 form flexures 250 that allow for axial movement that helps maintain a small gap between the disks 210, 220, and that makes the structure more resilient against mechanical disturbance.

Figure 11C:
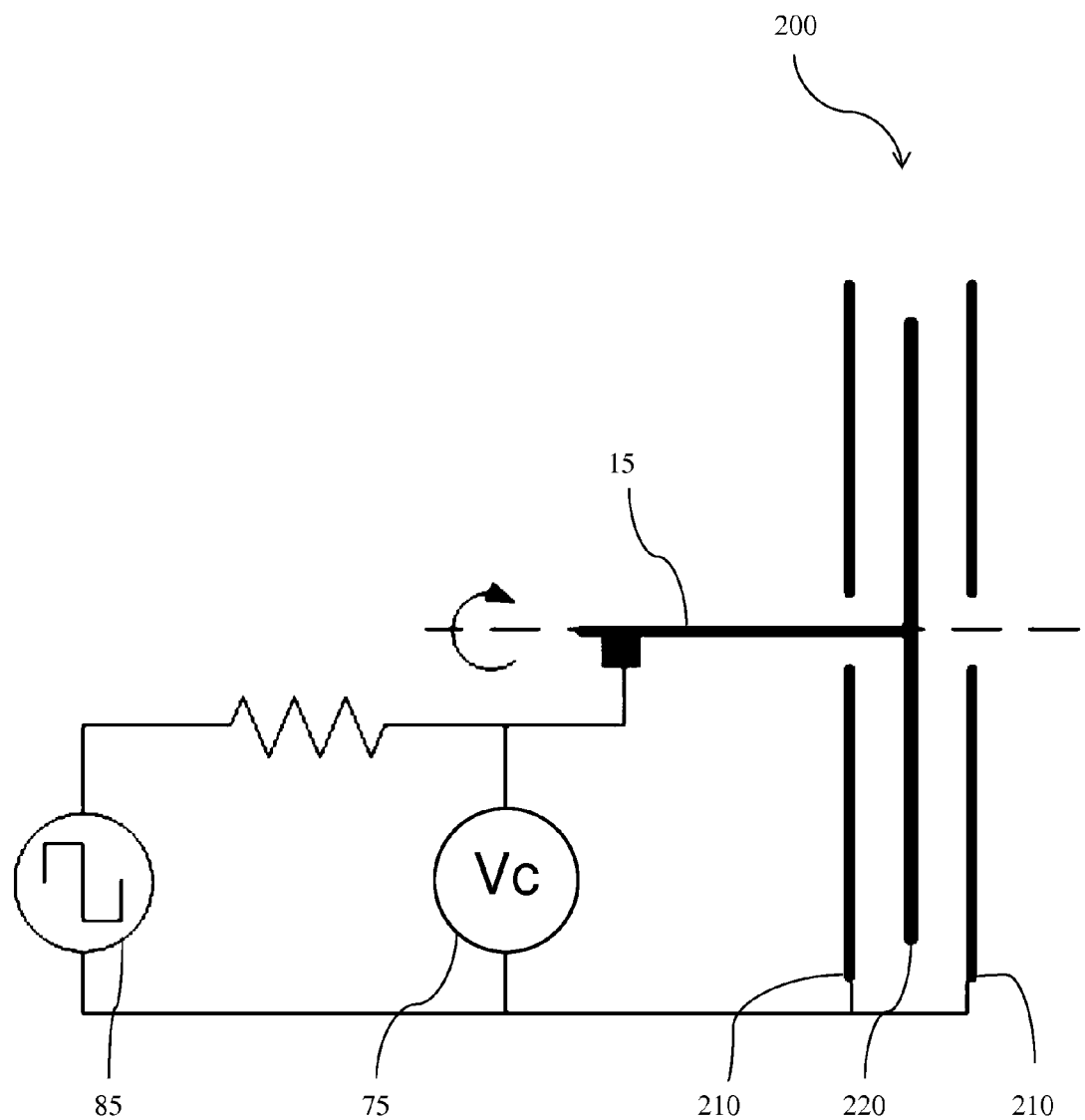
FIG. 11C shows a function generator 85 and an oscilloscope 75 connected to measure the voltage across stator and rotor disks 210, 220.

When the shaft 20 rotates, the rotor disk 220 rotates while the stator disks 210 remain fixed. Instead of a herringbone groove pattern 240A, such as the one shown in FIG. 7, the stator disks 210 in have spiral grooves 240B in the version in FIGS. 11A and 11B. The grooves 240A, 240B channel air between stator and rotor disks 210, 220 to help maintain disk separation as the rotor disks 220 rotate. The grooves 240A, 240B thus help provide even spacing, with a small gap between the disks 210, 220 for greater capacitance. Hydrodynamic flexing disks 210, 220 may utilize a variety of media to maintain separation of the plates during rotation, including liquids or gases; for example, air, oil, and specialty purpose or engineered liquids. Referring to FIG. 11C, with an AC voltage source and an oscilloscope connected to measure the voltage across the stator and rotor disks 210, 220, a zero-voltage reading is observed before the shaft 20 starts to spin because the stator and rotor disks 210, 220 touch (not shown). Once the shaft 20 starts to rotate, the disks 210, 220 separate, and a capacitor charging curve (similar to an RC time constant, not shown) is observed at the oscilloscope.

The hydrodynamic axial thrust shunt body style 300 in FIGS. 12A and 12B includes a spring-loaded thrust 310 that makes contact with the end bell 45. Rather than floating on the shaft 20, the shunt body 300 floats instead on the inner race 55. The shunt body 300 thus forms the capacitive interface with the bearing inner race 55 (or a disk, such as a brake rotor) rather than the shaft 20. The small gap between the shunt body 300 and the inner race 55 makes it the preferred path for high-frequency bearing current and enhances shunting. A retainment fastener 320 connects the shunt body 300 with the end bell 45 and restricts its rotation.

Figure 13B:
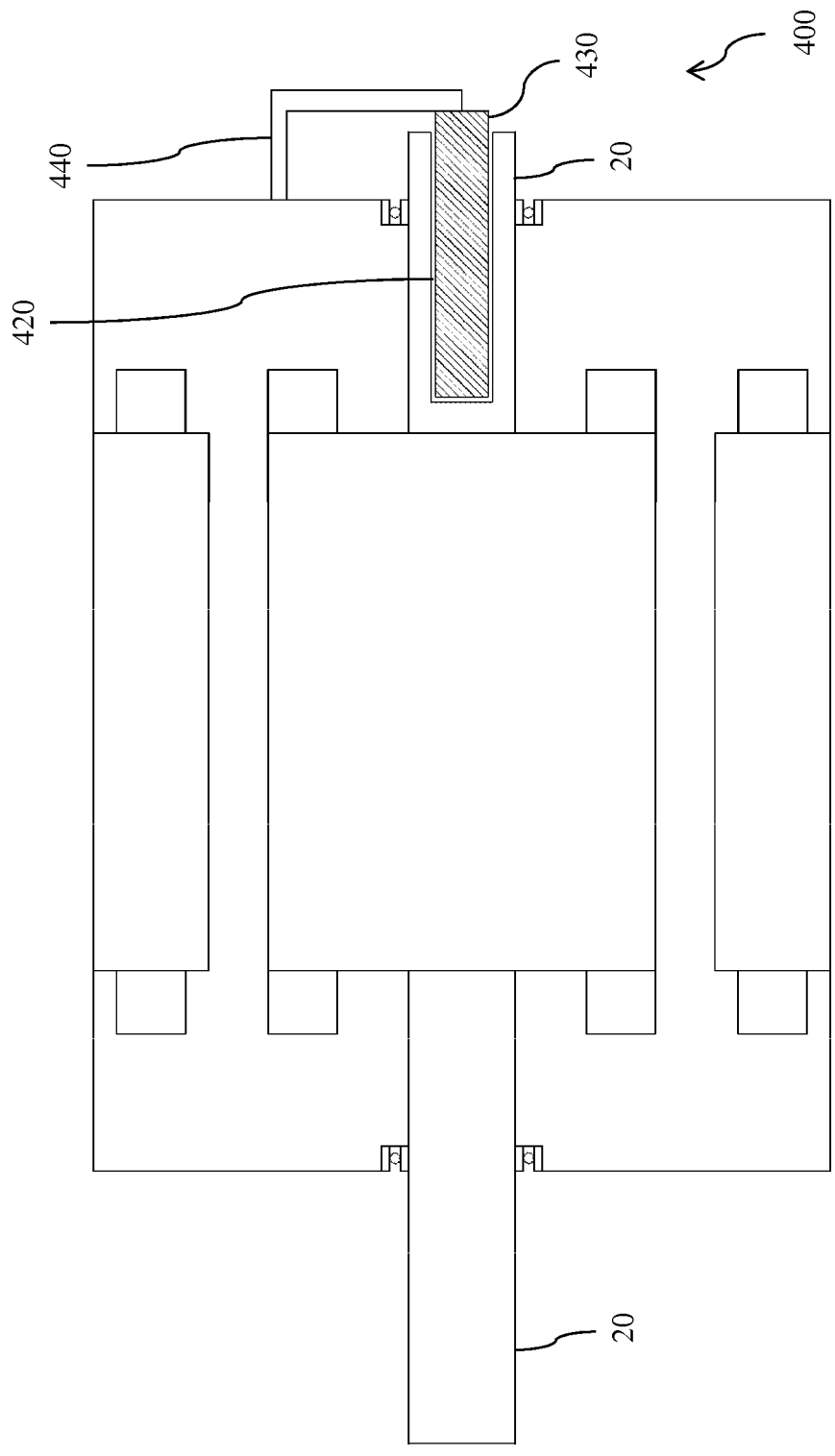
FIG. 13B is a cross-sectional side view of the assembly 400 of FIG. 13A situated in an electric machine.

The hydrodynamic bore form factor in FIGS. 13A and 13B includes a shunt body in the form of a cylindrical member 400 that is positioned within the shaft 20, unlike the shunt bodies 100, 200, 300 that are positioned about the shaft 20. Here, a void 410 (such as a cylindrical hole) is bored axially into the center line of the shaft 20. Cylindrical member 400 (such as a metallic rod), which may be impregnated with lubricant, is inserted partway into this void 410. An internal segment 420 is positioned within the shaft 20, and an external segment 430 extends out of the void 410 and is connected to the stator frame 25 of the electric machine 10 via a flexible tab or wire 440. Overall, this configuration provides the same operation as the above hydrodynamic sleeve 100, except the sleeve and the shaft in effect have their mechanical roles reversed: the shaft plays the role of the "sleeve" and the cylindrical member plays the role of the "shaft," with the cylindrical member 400 hydrodynamically floating in the bored void 410. The inserted cylindrical member 400 may be porous and contain a hollow/reservoir for lubricant storage.

It is noted that although the shunt body is primarily described as being capacitive, the shunt body can be resistive as well. For example, at lower speeds the hydrodynamic action is reduced and partial contact between the shunt body and shaft can occur, or a conducting (or partially conducting) lubricant can be used, making the shunt body behave as both a capacitor and a resistor simultaneously. Despite this, the rotary capacitor assembly is superior to a brush because there is limited solid-on-solid contact. The lubricant helps keep metal surfaces apart even if there is some conduction.

With the rotary capacitor assemblies discussed above, surface areas are much larger than the surface area of the ball bearings that carry the mechanical load. The rotating capacitor and the rotor shaft exhibit high capacitive coupling, greater than the ball bearing capacitance, creating a dominant alternative path for otherwise damaging higher-frequency AC bearing currents. The rotary capacitor assembly thus performs at least as well as a mechanical brush but without drawbacks (such as higher maintenance). Additionally, the rotating capacitor may be easily retrofitted onto a machine at low cost, unlike ceramic bearings, and is not as bulky or expensive as high frequency line filters.

Initially, it should be understood that any terms referring to orientation and position are relative terms rather than absolute ones; such terms should be regarded as words of convenience, rather than limiting terms. It must also be kept in mind that the rotary capacitor assemblies shown in the accompanying drawings and discussed above are merely exemplary, and may assume a wide variety of configurations different from those noted, and may use components different from those noted. The invention is not intended to be limited to the exemplary versions discussed above. Rather, the scope of rights to the invention is limited only by the claims set out below, and the invention encompasses all different versions that fall literally or equivalently within the scope of these claims.

The various preferred versions of the invention shown and described above illustrate different possible features of the invention and the varying ways in which these features may be combined. Apart from combining the different features of the foregoing versions in varying ways, other modifications are also considered to be within the scope of the invention. Following is an exemplary list of such modifications.

First, although the above discussion references rotors with rotatable shafts, the assemblies can be used with rotors having translational components with relatively minor adaptations.

Second, although the figures and discussion provides for one shunt body/rotary capacitor in the electric machine (i.e., motor, generator, etc.), multiple shunt capacitors can be included (e.g., one or more at each end or for each bearing).

Third, although the figures and discussion have primarily been provided in the context of induction motors, the invention is not limited only to induction motors. With little or no modification, the versions disclosed above are also applicable to all types of motors with the same operating principles applicable.

Fourth, although the figures show rotary capacitors inside or on motors, the rotary capacitor need not be so positioned. For example, if the shaft of a motor is coupled to a gearbox, the rotary capacitor could be placed on the gearbox to simultaneously provide protection for the gearbox and the motor. In such a configuration, the electric machine would be the gearbox, and the shaft would be that of the gearbox or the motor.

Fifth, although lubricants are discussed as liquids or gases (i.e., fluids such as oil, air, etc.) in a reservoir, the lubricant can be impregnated directly into metal without a reservoir. For example, lubrication can be accomplished via aluminum impregnated with graphite. The term lubricants discussed above thus includes not just fluids but also self-lubricating metals and other suitable form factors.

What is claimed is:
1. A rotary capacitor assembly for electric machinery,
   a. the assembly including a conducting shunt body sized to be received within or about a shaft of a rotor of an electric machine;
   b. wherein when the rotor is activated, the shunt body shunts high-frequency bearing current in an electric machine when the shunt body is positioned about or within the shaft of the rotor such that:
      i. the shaft is received through a central opening of the shunt body or the shunt body is at least partly inserted into the shaft;
      ii. the shunt body is electrically connected in parallel with a bearing of the electric machine, the bearing being situated about the shaft; and
      iii. the shunt body floats on a lubricant separating the shunt body from at least one of the shaft and the bearing.

2. The assembly of claim 1 wherein the shunt body forms a capacitive interface with at least one of the shaft and the bearing.

3. The assembly of claim 1 wherein the shunt body forms a parallel-plate capacitor with the shaft when:
   a. the shunt body and the shaft are separated by lubricant; and
   b. the shaft is rotating.

4. The assembly of claim 3 wherein the capacitor provides a shunt between an inner race of the bearing and an outer race of the bearing.

5. The assembly of claim 1 wherein the shunt body is configured to provide a substantially non-contact electrical connection between the rotor and a stator of an electrical machine for frequencies of at least 1 kHz.

6. The assembly of claim 1 wherein the shunt body diverts currents by lowering impedance to reduce shaft voltage below a bearing current threshold.

7. The assembly of claim 1 wherein the shunt body floats on lubricant on an outer or inner surface of the shaft when the rotor is activated.

8. The assembly of claim 1 wherein the shaft body includes a sleeve configured to encircle at least a part of a shaft of the rotor when the shaft extends through the central opening of the sleeve.

9. The assembly of claim 8 wherein the sleeve includes a conductive casing situated about:
   a. a lubricant-soaked wicking material; and
   b. a porous bushing.

10. The assembly of claim 8 further including a conducting mount directly connecting the shaft body with an outer race of the bearing in an electric machine.

11. The assembly of claim 8 wherein the sleeve includes a conductive casing situated about a lubricant-soaked wicking material.

12. The assembly of claim 8 wherein the sleeve includes a conductive casing situated about a porous bushing.

13. The assembly of claim 1 wherein when the shunt body is situated about the shaft, a lubricant between the shunt body and the shaft facilitates hydrodynamic bearing action such that the shunt body lifts off the shaft when the shaft starts to rotate.

14. The assembly of claim 1 wherein the shunt body is a set of parallel disks on a common axis.

15. The assembly of claim 14 wherein the shunt body includes a rotor disk sandwiched between two stator disks.

16. The assembly of claim 15 wherein at least one of the stator disks includes flexure beams configured to constrain the stator disk rotationally while allowing axial movement.

17. The assembly of claim 16 wherein the flexure beams include a circumferential slit cut into the stator disk along a portion of the outer edge thereof.

18. The assembly of claim 15 wherein the stator disks include a circumferential slit along a portion of the outer edge thereof.

19. The assembly of claim 1 wherein:
   a. the shunt body includes an axial thrust body; and
   b. when the shunt body is placed about the shaft of the rotor of the electric machine to shunt high-frequency bearing current,
      i. the axial thrust body extends axially between an end bell of the electric machine and the bearing of the electric machine; and
      ii. the shunt body capacitively interfaces with an inner race of the bearing.

20. The assembly of claim 1 wherein the assembly further includes the rotor having the shaft for receiving the shunt body.

21. The assembly of claim 1 wherein the shunt body includes a cylindrical member positioned in a void bored into the shaft.

22. The assembly of claim 1 wherein:
   a. the lubricant is situated in a gap separating the shunt body from at least one of the shaft and the bearing; and
   b. the gap is maintained hydrodynamically as the shaft rotates.

23. The assembly of claim 1 wherein the shunt body:
   a. is free to contact the shaft before the shaft starts rotating; and
   b. separates from the shaft when the shaft starts to rotate.

24. The assembly of claim 23 wherein the shunt body separates from the shaft due to hydrodynamic action.

25. The assembly of claim 1 wherein the lubricant is at least substantially non-conducting.

26. The assembly of claim 1 wherein once the shaft starts to rotate, the shunt body moves from a non-concentric position with the shaft into a substantially concentric position with the shaft.

27. The assembly of claim 1 wherein:
   a. the shunt body is a set of parallel disks on a common axis; and
   b. at least one of the parallel disks includes flexure beams configured to constrain the disk rotationally while allowing axial movement.

28. The assembly of claim 27 wherein the flexure beams include a circumferential slit cut into the stator disk along a portion of the outer edge thereof.

29. The assembly of claim 1 wherein:
   a. the shunt body is a set of parallel disks on a common axis; and
   b. at least one of the parallel disks includes a circumferential slit along a portion of the outer edge thereof.

30. The assembly of claim 1 wherein:
   a. the shunt body includes a rotor disk sandwiched between two stator disks; and
   b. at least one of the stator disks includes flexures configured to constrain the stator disk rotationally while allowing axial movement.

31. The assembly of claim 1 wherein:
   a. the shunt body includes a rotor disk on a common axis with a stator disk; and
   b. the stator disk includes flexures configured to allow for axial movement.

32. The assembly of claim 1 wherein:
   a. the shunt body includes a rotor disk on a common axis with a stator disk; and
   b. the stator disk includes slits formed therein to allow for axial movement.

33. The assembly of claim 1 wherein:
   a. the shunt body includes a rotor disk on a common axis with a stator disk; and
   b. the stator disk includes flexures formed therein, the flexures being configured to give the rotor disk and the stator disk freedom of motion for alignment.

34. The assembly of claim 1 wherein the shunt body is at least partly positioned in a void bored into the shaft.

35. The assembly of claim 1 wherein the shunt body is connected in series with an active electronic circuit that is configured to:
   a. sense at least one of a current and a voltage; and
   b. inject voltage or current in proportion to at least one of the sensed current or the sensed voltage to reduce high frequency potential across the bearing.

36. A method of using a rotary capacitor assembly for electric machinery,
   a. the assembly including a conducting shunt body sized to be received within or about a shaft of a rotor of an electric machine;
   b. wherein the method includes the step of, when the rotor is activated, shunting high-frequency bearing current in an electric machine with the shunt body positioned about or within the shaft of the rotor such that:
i. the shaft is received through a central opening of the shunt body or the shunt body is at least partly inserted into the shaft;
ii. the shunt body is electrically connected in parallel with a bearing of the electric machine, the bearing being situated about the shaft; and
iii. the shunt body floats on a lubricant separating the shunt body from at least one of the shaft and the bearing.

37. The method of claim 36 further including the step of using the shunt body to form a substantially non-contact electrical connection between the rotor and a stator of the electrical machine for frequencies of at least 1 kHz.

38. The method of claim 36 further including the steps of:
a. boring a void axially into the shaft;
b. inserting the shunt body at least partly into the void such that an external segment extends out from the shaft; and
c. securing the external segment of the shunt body to the stator frame of the electric machine.

39. The method of claim 36 wherein the shunt body is at least partly positioned in a void bored into the shaft.

40. The assembly of claim 36 wherein:
a. the shunt body includes an axial thrust body; and
b. when the shunt body is placed about the shaft of the rotor of the electric machine to shunt high-frequency bearing current,
i. the axial thrust body extends axially between an end bell of the electric machine and the bearing of the electric machine; and
ii. the shunt body capacitively interfaces with an inner race of the bearing.

41. The method of claim 36 wherein:
a. the lubricant is situated in a gap separating the shunt body from at least one of the shaft and the bearing; and
b. the gap is maintained hydrodynamically as the shaft rotates.

42. The method of claim 41 wherein the shunt body separates from the shaft due to hydrodynamic action.

43. The method of claim 36 wherein the shunt body:
a. is free to contact the shaft before the shaft starts rotating; and
b. separates from the shaft when the shaft starts to rotate.

44. The method of claim 36 wherein the lubricant is at least substantially non-conducting.

45. The method of claim 36 wherein once the shaft starts to rotate, the shunt body moves from a non-concentric position with the shaft into a substantially concentric position with the shaft.

46. A rotary capacitor assembly for electric machinery,
a. the assembly including:
i. a rotor having a rotatable shaft;
ii. a bearing situated about the shaft; and
iii. a conducting shunt body situated about the shaft or within the shaft;
b. wherein:
i. with a lubricant therebetween, the shunt body forms a capacitive interface with at least one of the shaft and the bearing;
ii. when the capacitor assembly is part of an electric machine, a non-contact electrical connection is formed between the shaft and a stator for frequencies of at least 1 kHz;
iii. the shunt body is inserted into a void in the shaft, with an internal segment situated within the void and an external segment extending out from the shaft; and
iv. the internal segment floats on the shaft when the shaft rotates.

47. A rotary capacitor assembly for electric machinery,
a. the assembly including:
i. a rotor having a rotatable shaft;
ii. a bearing situated about the shaft; and
iii. a conducting shunt body situated about the shaft or within the shaft;
b. wherein:
i. with a lubricant therebetween, the shunt body forms a capacitive interface with at least one of the shaft and the bearing;
ii. when the capacitor assembly is part of an electric machine, a non-contact electrical connection is formed between the shaft and a stator for frequencies of at least 1 kHz; and
iii. the shunt body hydrodynamically separates from at least one of the shaft and the bearing when the shaft starts to rotate.

48. The assembly of claim 47 wherein the shunt body includes a rotor disk concentrically situated between two stator disks.

49. The assembly of claim 47 wherein the shunt body is connected in series with an active electronic circuit that is configured to control the potential difference between the rotor and the stator.

50. The assembly of claim 49 wherein the active electronic circuit is configured to:
a. sense at least one of a current and a voltage; and
b. inject voltage or current in proportion to at least one of the sensed current or the sensed voltage to reduce high frequency potential across the bearing.

51. The assembly of claim 47 wherein:
a. the lubricant is situated in a gap separating the shunt body from at least one of the shaft and the bearing; and
b. the gap is maintained hydrodynamically as the shaft rotates.

52. The assembly of claim 47 wherein the shunt body is free to contact the shaft before the shaft starts rotating.

53. The assembly of claim 47 wherein the lubricant is at least substantially non-conducting.

54. The assembly of claim 47 wherein once the shaft starts to rotate, the shunt body moves from a non-concentric position with the shaft into a substantially concentric position with the shaft.

55. The assembly of claim 47 wherein:
a. the shunt body includes a rotor disk sandwiched between two stator disks; and
b. at least one of the stator disks includes flexures configured to constrain the stator disk rotationally while allowing axial movement.

* * * * *